United States Patent
Petersen et al.

(10) Patent No.: US 7,340,068 B2
(45) Date of Patent: Mar. 4, 2008

(54) DEVICE AND METHOD FOR DETECTING WIND NOISE

(75) Inventors: Kim Spetzler Petersen, Hellerup (DK); Gudmundur Bogason, Hellerup (DK); Ulrik Kjems, Hellerup (DK); Thomas Bo Elmedyb, Hellerup (DK)

(73) Assignee: Oticon A/S, Smorum (DK)

( * ) Notice: Subject to any disclaimer, the term of this patent is extended or adjusted under 35 U.S.C. 154(b) by 890 days.

(21) Appl. No.: 10/367,955

(22) Filed: Feb. 19, 2003

(65) Prior Publication Data

US 2004/0161120 A1 Aug. 19, 2004

(51) Int. Cl.
*H04R 3/00* (2006.01)
*H04R 25/00* (2006.01)
*H04B 15/00* (2006.01)

(52) U.S. Cl. ............... 381/92; 381/94.1; 381/94.2; 381/111; 381/94.3; 381/312; 381/317

(58) Field of Classification Search ............ 381/92, 381/94.1, 312, 94.2, 94.3, 111, 317
See application file for complete search history.

(56) References Cited

U.S. PATENT DOCUMENTS

| | | | | | |
|---|---|---|---|---|---|
| 3,786,188 | A | * | 1/1974 | Allen | 704/263 |
| 4,090,032 | A | * | 5/1978 | Schrader | 381/57 |
| 5,347,586 | A | * | 9/1994 | Hill et al. | 381/71.8 |
| 5,473,701 | A | | 12/1995 | Cezanne et al. | |
| 5,712,437 | A | * | 1/1998 | Kageyama | 84/610 |
| 6,525,993 | B2 | * | 2/2003 | Wake et al. | 367/127 |
| 6,675,114 | B2 | * | 1/2004 | Ando et al. | 702/75 |
| 6,741,714 | B2 | * | 5/2004 | Jensen | 381/313 |
| 7,082,204 | B2 | * | 7/2006 | Gustavsson | 381/92 |
| 2004/0008850 | A1 | * | 1/2004 | Gustavsson | 381/92 |

FOREIGN PATENT DOCUMENTS

| | | |
|---|---|---|
| JP | 10-23590 | 1/1998 |
| JP | 2001-124621 | 5/2001 |

* cited by examiner

*Primary Examiner*—Vivian Chin
*Assistant Examiner*—Devona E. Faulk
(74) *Attorney, Agent, or Firm*—Dykema Gossett PLLC

(57) ABSTRACT

A device for detecting the presence of wind noise in an array of microphones including two or more separate sound inlet openings, and a sound to electrical converting element or microphone in relation to each sound inlet opening. The microphones each generate time dependent signals which are fed to a signal processing device that provides one or more output signals. The signal processing device has means for generating a time dependent cross correlation function between a first and a second microphone signal, and means for generating a signal corresponding to a time dependent auto correlation function of either the first or the second of the microphone signals. Further, the signal processing device has means for comparing the values of the auto correlation function and the cross correlation function and the means for comparing are arranged to detect the condition that the auto correlation function is substantially higher than the cross correlation function, whereby the condition is indicative of the presence of wind noise.

20 Claims, 2 Drawing Sheets

DEVICE AND METHOD FOR DETECTING WIND NOISE

AREA OF THE INVENTION

The invention relates to a device for detecting the presence of wind noise in an array of microphones. The device comprises two or more separate sound inlet openings, and a sound to electrical converting element or microphone in relation to each sound inlet opening, where the microphones generates each their time dependant signals and where said signals are fed to a signal processing device which provides one or more output signals. The output signals can be used in various audio systems, such as hearing aids, headsets, telephones or wireless microphones.

The invention also relates to a method of detecting wind noise in a system having more than one microphone.

BACKGROUND OF THE INVENTION

In audio systems comprising directional microphones or microphone arrays, it has been a problem that wind noise is generated even at very low wind-speeds. It has been attempted to solve the problem by placing a windscreen in front of the microphone sound inlet opening, but this inevitably results in reduced overall performance of the microphone. This is known in hearing aid with directional microphones or with two or more microphones and DSP systems for generating an output with directionality.

In: "Digital Signal Processing, Principles, Algorithms, and Applications" by John G. Proakis et al. it is explained how wind noise is a seismic signal (a signal created by nature) in the range from 100 to 1000 Hz. In micro-phone systems with two or more sound inlet ports the wind noise is generated by local air turbulence around the inlet openings, and therefor the sound signals received at the microphones will be uncorrelated. It is an object of the invention to use the nature of the wind noise signal to detect the presence of wind noise in microphone systems with two or more sound inlet openings and two or more independent electrical outputs.

The invention comprises a device of the above kind, where the signal processing device has means for generating a first time dependant correlation signal composed of cross correlation function values between a first and a second microphone signal and, means for generating a second time dependant correlation signal composed of auto correlation function values of either the first or the second of the microphone signals and where the signal processing device has means for comparing the values of the first and the second correlation signal and that the means for comparing are arranged to detect the condition that the second correlation signal value is higher than the first correlation signal value, whereby said condition is indicative of the presence of wind noise.

This device is very simple to implement either as a digital or as an analog device. In digital devices the processing powers needed to calculate the cross correlation function values is limited, and the comparing means are also standard devices in both digital and analog devices. When wind noise is detected, this information can be used in a number of different ways. A wind noise-damping filter can be switched on, or instead of array processing, the signal from a single omnidirectional microphone may be used in the signal processing device to generate the output.

In a further aspects, the invention comprises a device for detecting the presence of wind noise in an array of microphones comprising two or more separate sound inlet openings, and a sound to electrical converting element or microphone in relation to each sound inlet opening, where the microphones generate time-dependent signals and where said signals are fed to a single processing device which provides one ore more output signals, the signal process device including means for combining the microphone signals in order to form a single directional signal and where further the signal processing device has means for forming a first time dependent correlation signal composed of auto correlation function values from one of the microphone signals before said signal is combined with the other signals and further has means for forming a second time dependent correlation signal composed of auto correlation function values of the single directional signal and where the signal processing device has means for comparing the value of the first correlation signal and the second correlation signal and that the means for comparing are arranged to detect the condition that the second correlation signal value is higher than the first correlation signal value, whereby said condition is indicative of the presence of wind noise.

In this aspect of the invention the nature of the directional algorithm is used, and only the auto correlation values of the input signals to the directional algorithm and the auto correlation values of the output directional signal is generated, and on the basis of their mutual size it is determined whether wind noise is present or not.

In an embodiment of the invention the device comprises a low pass filter between the microphones and the means for generating the correlation signals. As wind noise typically is in the frequency range of 100 Hz to 1000 Hz the signal used in the detecting device does not need to have any high frequency components. Further the limitation to frequencies below 1000 Hz allows the process to be run down sampled (in digital systems), and this saves processing powers and energy.

It is preferred that each of the correlation functions are generated continually using only single signal values at a given point in time. In the digital case, this means that squaring each of the sample values generates the short term autocorrelation in lag zero values, and multiplying single point signal values from the respective microphones generates the short term cross correlation value in lag zero. These are very simple signal processing schemes in the digital domain, but also for analog signal processing, similarly simple processing can do this. The formulas for an autocorrelation and a cross correlation are $$r_{xx}(l) = <x(n)x(n-l)> \text{(Autocorrelation)}$$

$$r_{xy}(l) = <x(n)y(n-l)> \text{(Crosscorrelation)}$$

In the described embodiment of the invention l is set to 0, so the correlation value is in both cases generated by one simple multiplication. If n=0 is the present sample, a segment will be chosen form n=−k to n=k for a practical calculation of the correlation. In the present embodiment k is set to 0, and the correlation degenerates to a simple multiplication.

In a preferred embodiment a mean value generator is provided for each of the correlation functions. In digital processing this could be done by a simple IIR filter having the following form:

$$H(z) = 1/(1 - a_1 * z^{-1})$$

The value $a_1$ determines the weight of the previous samples with respect to the present sample, and thus determines the dynamic behavior of the system. A suitable value for $a_1$ is 0.9999 at 16 kHz sampling frequency. Many other IIR or FIR filters may produce values, which gives a good representation of the mean value at a given time. Also for analog instruments such a mean value generator is simple to implement, eg. as an integrator with loss.

According to the a further embodiment of the invention the means for comparing the auto correlation function in lag zero with the mean value of the cross correlation function in lag zero are arranged to determine that wind noise is present whenever the estimated value of the auto correlation function is more than 1.5, preferably more than 2.0 times bigger than the estimated value of the cross correlation function. Thereby it is ensured, that whenever the wind noise becomes so loud, that it is perceived as annoying the signal processor gets a message from the comparing means, and appropriate measures can be taken to lessen the effect of the wind noise.

According to yet another embodiment, the means for comparing are designed to only become active whenever a given level of signal energy in the microphone channels is detected. This is important, because in some systems the noise generated by the microphones themselves is considerable, and as this noise is also un-correlated, it may trigger the wind detection mechanism, even if there is no air circulation at all around the sound inlet openings.

In a further aspect the invention concerns a method for detecting the presence of wind noise in a system comprising two or more microphone elements having each their sound inlet openings, where first correlation signal is generated composed of the cross correlation values between a first and a second microphone signal and where further a second correlation signal is generated composed of auto correlation function values of either the first or the second of said microphone signals, and where the values of the first correlation signal and the second correlation signal are compared, and that a wind noise indicator is activated whenever the value of the second correlation signal is higher than the value of the first correlation signal.

In a further aspect of the method according to the invention the system comprises two or more microphone elements having each their sound inlet openings. Here the microphone signals are combined in order to generate a single directional signal. A first correlation signal is generated from composed of auto correlation function values of one of said microphone signals and also a second correlation signal is generated composed of auto correlation function values of the directional signal, and the value of the first correlation signal is compared to the value of the second correlation signal, and a wind noise indicator is activated whenever the value of the second correlation signal is higher than the value of the first correlation signal.

DESCRIPTION OF A PREFERRED EMBODIMENT

Figure 1:
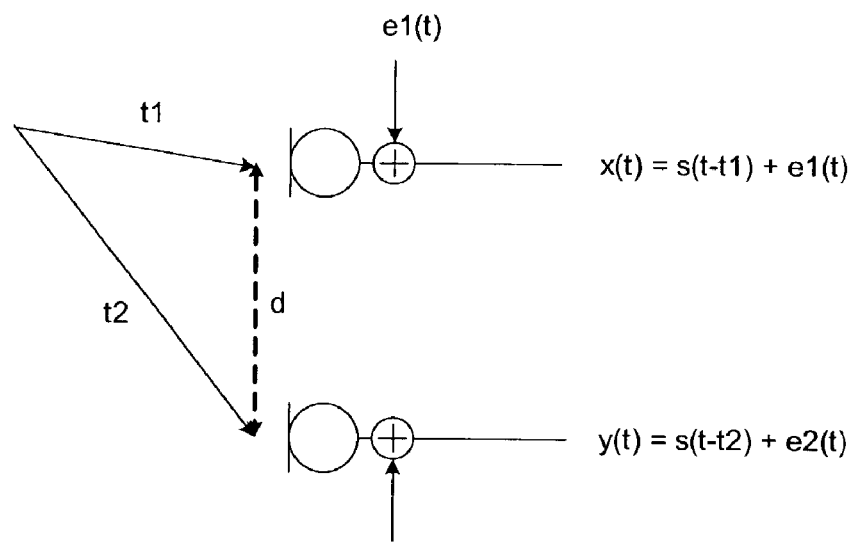
FIG. 1 is a basic model of the noise in a two-microphone system.

FIG. 1 shows a system with two microphones and an external sound source s(t). The time delay from the sound source s(t) to the two microphones is t1 and t2 respectively. The distance between the two microphones is d. The wind noise in each microphone is represented as a noise source $e_1$ and $e_2$ respectively. These two noise sources are un-correlated, which means that cross correlation between $e_1$ and $e_2$ is approximately zero. The output from the microphones will be:

$$x(t)=s(t-t1)+e_1(t)$$

$$y(t)=s(t-t2)+e_2(t)$$

The autocorrelation at lag zero of x ($r_{XX}$) and the maximum of the autocorrelation of y ($r_{YY}$) consist of the energy of: the external sound source s(t), the wind noise and the internal noise of the microphone. The contribution of the internal noise is considered negligible at this point and is dealt with later. The wind noise is an external noise source, but due to its un-correlated nature it can be modeled as an internally generated signal. Mathematically the autocorrelations of the signals x and y can be expressed like this:

$$r_{XX}(l)=r_{SS}(l)+r_{e1,e1}(l)$$

$$r_{YY}(l)=r_{SS}(l)+r_{e2,e2}(l)$$

Mathematically the cross correlation between x(t) and y(t) can be written as:

$$r_{XY}(l)=r_{SS}(l+t1-t2)+r_{e1,e2}(l)$$

As the correlation between e1 and e2 is approximately zero we are able to approximate with:

$$r_{XY}(l)=r_{SS}(l+t1-t2)$$

In a wind noise situation the value of the cross correlation is smaller than the value of the auto correlation, which is what this wind noise detector uses, i.e. $r_{XY}<r_{XX}$ or $r_{XY}<r_{YY}$ since $r_{e1,e2}$ remains approximately zero and $r_{e1,e1}(l)$ or $r_{e2,e2}(l)$ grows with growing wind noise. Because the wavelength of the highest frequency is much longer than the distance between the microphones, t1-t2 is approximately zero.

Figure 2:
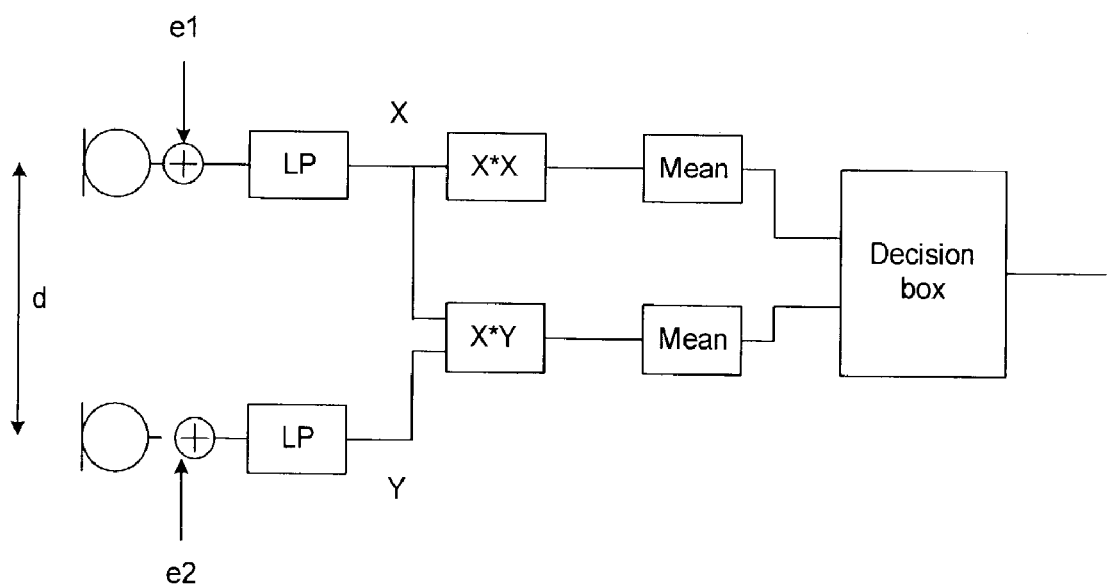
FIG. 2 is a diagram showing the signal processing elements of the wind noise detecting system according to the invention.

In FIG. 2 the system from FIG. 1 is shown with the signal processing. In this system a correlation length of 1 sample is used. The system requires that the microphones distance d is much smaller than the wavelength of the highest frequency. If the distance d is large so that t1-t2 is not approximately zero, longer lag times in the correlation calculation is needed, and the maximum value of the correlation is passed on as the result.

The described system will work with a sampling frequency of 16 kHz. In the system an analog to digital converter (not shown) is placed before the low pass filter LP in FIG. 2. The system is equipped with 2 hearing aid microphones EM-type from Knowles with a preamplifier.

The low pass filter is a second order Butterworth filter (biquad), which has a cut off frequency of 1000 Hz. This low pass filter makes sure that only those frequencies, which are of interest, are fed to the wind noise detection system. Further, it gives the opportunity to run the processing down sampled. A FIR filter would produce the same result. The wavelength of a 1000 Hz tone is approximately 32 cm., which is much longer than the distance between the two microphones. As earlier described; if the distance between the microphones means that the difference between the t1 and t2 is not approximately zero. In that case, one needs to calculate a longer lag space and find the maximum, i.e., where the difference between t1 and t2 is approximately zero.

In the box X*X in FIG. 2 the value of the auto correlation in sample zero ($r_{x,x}(0)$) of the low pass filtered signal from the microphone is calculated. In this system we square the signal, which is the same as a short term energy measure. In the box X*Y in FIG. 2 we calculate the value of the cross correlation in sample zero ($r_{x,y}(0)$). If the distance between the two microphones is large, the value t1-t2 is not approximately zero and one need to calculate a larger correlation length and find the maximum.

A way to calculate the true mean value is to summarize all data and divide with the number of data. This version is for obvious reasons not possible to implement. A method that that can be implemented is to calculate in segments. Another way is to feed the sample through a suitable IIR filter, preferably a first order IIR filter. The chosen filter can be described in the following way:

$$H(z)=1/(1-a_1*z-1)=1/(1-0.9999*z-1)$$

The filter is not very critical and can be implemented in various other ways (IIR or FIR). The value of $a_1$ is comparable to a time constant, and determines the reaction time to shifts in wind noise level.

In the decision box it is determined whether there is wind noise or not. In the present example of the invention the decision limit is set such that wind noise is detected when the auto correlation mean value is more than twice as large as the calculated cross correlation mean value. Because of the relative large amount of uncorrelated microphone noise, decision limit as a function of the energy is also incorporated into the decision algorithm. In this way there has to be some acoustical input to the microphones before the above limit will be calculated. This problem is mostly related to hearing aid microphones or other nosy microphones.

It is also possible to implement the system in an entirely analog version. The system has the same dataflow as shown in FIG. 2, but some of the boxes can be implemented in another way. First, the mean value calculator can be implemented as an integrator with loss. Mathematically this is nearly the same as the digital version described above. The decision box then relates to a comparator in the analog domain. The filters and multiplicators are normal analog building blokes.

Figure 3:
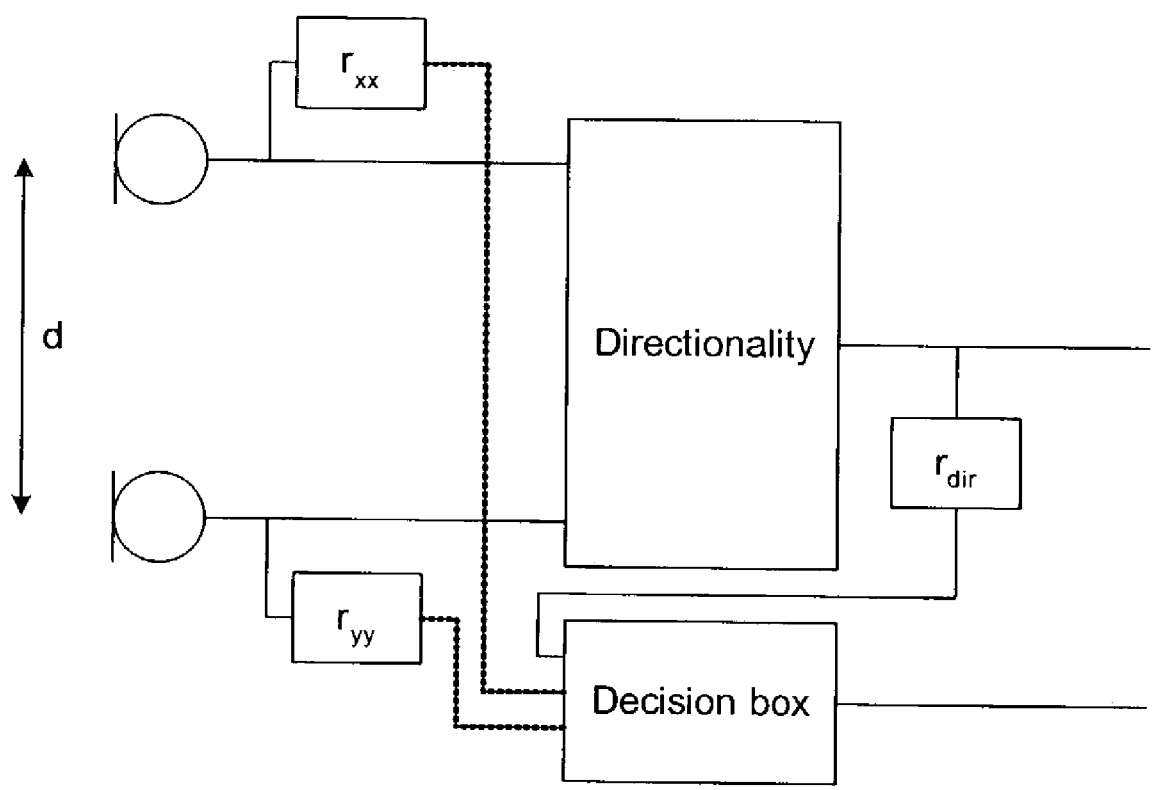
FIG. 3 is a diagram showing the signal processing elements in the directional system with two microphones in a directional algorithm for combining the signals from the two microphones.

Another way of designing a wind noise detector is to make use of the directionality (fx. Gary Elko, U.S. Pat. No. 5,473,701). In this algorithm we use the difference between the autocorrelation of one of the inputs and the autocorrelation of the outputs. The system is shown in FIG. 3. The wind noise measure system uses that the wind noise in the input channel X or Y consist of target signal s(t) and the signal from the wind noise $e_1$ or $e_2$ respectively. Then the auto correlation function is:

$$r_{xx}(l)=r_{ss}(l)+r_{e1,e1}(l) \text{ or } r_{yy}(l)=r_{ss}(l)+r_{e2,e2}(l)$$

The auto correlation from the output signal of the directional algorithm consists of the correlation of the autocorrelation of the target signal and the auto correlation of both the wind noise sources. i.e.

$$r_{DIR,DIR}(l)=a*r_{ss}(l)+r_{e1,e1}(l)+r_{e2,e2}(l) \text{ (a is a scaling factor from the directional algorithm)}$$

The system works then by detecting the difference between the input autocorrelation $r_{XX}$ or $r_{YY}$ and the output autocorrelation of the directional system $r_{DIR,DIR}$. For large values of wind noise we have $r_{DIR,DIR} > r_{XX}$ or $r_{DIR,DIR} > r_{YY}$.

The calculation of the correlation values can be made as earlier described. The decision should also be the same but the input signals to the decision box are measured in different places. The boundary between detection wind noise and not are the same as in the first described system because of the missing noise signal (the signal, which the directionality algorithm removes). In the real world the signal would only be damped because of reverberations and therefore the decision boundary should be a variable of how efficient the directional algorithm is.

The invention claimed is:

1. Device for detecting the presence of wind noise in an array of microphones comprising two or more separate sound inlet openings, and a sound to electrical converting element or microphone in relation to each sound inlet opening, where the microphones generates each their time dependant signals and where said signals are fed to a signal processing device which provides one or more output signals where the signal processing device has means for generating a first time dependant correlation signal composed of cross correlation function values between a first and a second microphone signal and, means for generating a second time dependant correlation signal composed of auto correlation function values of either the first or the second of the microphone signals, wherein the signal processing device has means for comparing the values of the first and the second correlation signal and the means for comparing are arranged to detect a condition when the second correlation signal value is higher than the first correlation signal value, whereby said condition is indicative of the presence of wind noise, and wherein the means for comparing the first correlation function with the second correlation function are arranged to determine that wind noise is present whenever the mean value of the second correlation function is more than 1.5 times larger than the mean value of the first correlation function.

2. Device as claimed in claim 1, including a low pass filter between the microphones and the means for generating the correlation signals.

3. Device as claimed in claim 1, including a mean value generator for each of the correlation signals.

4. Device as claimed in claim 1, where the means for comparing are designed to only become active whenever a given level of signal energy in the microphone channels is detected.

5. Device for detecting the presence of wind noise in an array of microphones comprising two or more separate sound inlet openings, and a sound to electrical converting element or microphone in relation to each sound inlet opening, each microphone generating time-dependant signals, and a signal processing device to which the time-dependent signals are fed, said signal processing device including means for combining the microphone signals in order to form a single directional signal, means for forming a first time dependant correlation function composed of auto correlation function values from one of the microphone signals before said signal is combined with the other signals, means for forming a second time-dependant correlation signal composed of auto correlation function values of the single directional signal, and comparing means for comparing the values of the first correlation signal and the second correlation signal, said comparing means detecting a condition when the second correlation signal value is higher than the first correlation signal value, indicating the presence of wind noise.

6. Device as claimed in claim 5, including a low pass filter between the microphones and the means for generating the correlation signals.

7. Device as claimed in claim 5, including a mean value generator for each of the correlation signals.

8. Device as claimed in claim 5, wherein the comparing means for comparing the first correlation function with the second correlation function are arranged to determine that wind noise is present whenever the mean value of the second correlation function is more than 1.5 times larger than the mean value of the first correlation function.

9. Device as claimed in claim 5, where the means for comparing are designed to only become active whenever a given level of signal energy in the microphone channels is detected.

10. Method for detecting the presence of wind noise in a system comprising two or more microphone elements having each their sound inlet openings, where a first correlation signal is generated composed of the cross correlation values of a first and a second microphone signal, and where further a second correlation signal is generated composed of auto correlation function values of either the first or the second of said microphone signals, and where the first correlation signal and the second correlation signal are compared, and that a wind noise indicator is activated whenever the value of the second correlation signal is higher than the value of the first correlation signal, where the condition for wind noise detection is met whenever the mean value of the second correlation function is more than 1.5 times larger than the mean value of the first correlation function.

11. Method as claimed in claim 10, where the signals from the microphones are passed through a low pass filter before the correlation signals are generated.

12. Method as claimed in claim 1, where each of the correlation functions are generated continually using only a single value at a given point in time.

13. Method as claimed in claim 10, where a mean value is generated for each of the correlation function signals.

14. Method as claimed in claim 10, where the means for comparing only become active whenever a given level of signal energy in the microphone channels is detected.

15. Method for detecting the presence of wind noise in a system comprising two or more microphone elements having each their sound inlet openings, and where the microphone signals are combined in order to generate a single directional signal, and where a first correlation signal is generated composed of the auto correlation function values from one of said microphone signals and where a second correlation signal is generated composed of auto correlation function values from the directional signal, and where the value of the first correlation signal is compared to the value of the second correlation signal, and a wind noise indicator is activated whenever the value of the second correlation signal is higher than the value of the first correlation signal.

16. Method as claimed in claim 15, where the signals from the microphones are passed through a low pass filter before the correlation signals are generated.

17. Method as claimed in claim 15, where each of the correlation functions are generated continually using only a single signal value at a given point in time.

18. Method as claimed in claim 15, where a mean value is generated for each of the correlation function signals.

19. Method as claimed in claim 15, where the condition for wind noise detection is met whenever the mean value of the second correlation function is more than 1.5 times larger than the mean value of the first correlation function.

20. Method as claimed in claim 15, where the means for comparing only become active whenever a given level of signal energy in the microphone channels is detected.

* * * * *